United States Patent [19]
Wei

[11] Patent Number: 5,398,073
[45] Date of Patent: Mar. 14, 1995

[54] CONCATENATED CODED VESTIGIAL SIDEBAND MODULATION FOR HIGH DEFINITION TELEVISION

[75] Inventor: Lee-Fang Wei, Lincroft, N.J.
[73] Assignee: AT&T Corp., Murray Hill, N.J.
[21] Appl. No.: 226,606
[22] Filed: Apr. 12, 1994
[51] Int. Cl.⁶ ............................................. H04N 7/04
[52] U.S. Cl. ................................. 348/487; 348/432; 348/471
[58] Field of Search ............. 348/426, 432, 433, 469, 348/427, 724; 375/18, 43, 39; H04N 7/04

[56] References Cited

U.S. PATENT DOCUMENTS

| | | | |
|---|---|---|---|
| 4,641,179 | 2/1987 | LoCiceio et al. | 348/487 |
| 5,105,442 | 4/1992 | Wei | 375/39 |
| 5,164,963 | 11/1992 | Lawrence et al. | 375/39 |
| 5,305,352 | 4/1994 | Calderbank et al. | 375/39 |
| 5,311,547 | 5/1994 | Wei | 375/18 |
| 5,315,617 | 5/1994 | Guida et al. | 375/39 |
| 5,327,725 | 6/1994 | Paik et al. | 375/39 |

Primary Examiner—Victor R. Kostak
Attorney, Agent, or Firm—Ronald D. Slusky

[57] ABSTRACT

A modulation scheme for HDTV, for example, uses a concatenated code comprised of a Reed-Solomon coder followed by an N-dimensional trellis coder whose N-dimensional output symbols with $N>1$, are used to modulate a one-dimensional vestigial sideband modulator. Specifically, each N-dimensional symbol is a sequence of N one-dimensional signal points—specifically signal points of a one-dimensional VSB constellation.

42 Claims, 8 Drawing Sheets

| 4D SUBSET | Y3$_n$ | Y2$_n$ | Y1$_n$ | Y0$_n$ | Z0$_n$ | Z0$_{n+1}$ | Z0$_{n+2}$ | Z0$_{n+3}$ | 1D-SUBSET SEQUENCE |
|---|---|---|---|---|---|---|---|---|---|
| 0 | 0 | 0 | 0 | 0 | 0 | 0 | 0 | 0 | (A,A,A,A) |
|   | 1 | 0 | 0 | 0 | 1 | 1 | 1 | 1 | (B,B,B,B) |
| 1 | 0 | 0 | 0 | 1 | 0 | 0 | 0 | 1 | (A,A,A,B) |
|   | 1 | 0 | 0 | 1 | 1 | 1 | 1 | 0 | (B,B,B,A) |
| 2 | 0 | 0 | 1 | 0 | 0 | 0 | 1 | 1 | (A,A,B,B) |
|   | 1 | 0 | 1 | 0 | 1 | 1 | 0 | 0 | (B,B,A,A) |
| 3 | 0 | 0 | 1 | 1 | 0 | 0 | 1 | 0 | (A,A,B,A) |
|   | 1 | 0 | 1 | 1 | 1 | 1 | 0 | 1 | (B,B,A,B) |
| 4 | 0 | 1 | 0 | 0 | 0 | 1 | 0 | 1 | (A,B,A,B) |
|   | 1 | 1 | 0 | 0 | 1 | 0 | 1 | 0 | (B,A,B,A) |
| 5 | 0 | 1 | 0 | 1 | 0 | 1 | 1 | 1 | (A,B,B,B) |
|   | 1 | 1 | 0 | 1 | 1 | 0 | 0 | 0 | (B,A,A,A) |
| 6 | 0 | 1 | 1 | 0 | 0 | 1 | 1 | 0 | (A,B,B,A) |
|   | 1 | 1 | 1 | 0 | 1 | 0 | 0 | 1 | (B,A,A,B) |
| 7 | 0 | 1 | 1 | 1 | 0 | 1 | 0 | 0 | (A,B,A,A) |
|   | 1 | 1 | 1 | 1 | 1 | 0 | 1 | 1 | (B,A,B,B) |

BIT PATTERN: Z3$_m$Z2$_m$Z1$_m$Z0$_m$

FIG. 7

| CONSTELLATION SIZE | NUMBER OF INPUT BITS COLLECTED OVER FOUR SIGNALING INTERVALS FOR 4D TRELLIS CODE (K) | NUMBER OF INPUT BITS COLLECTED OVER EIGHT SIGNALING INTERVALS FOR 8D TRELLIS CODE ($K_1$) | ACTIONS REQUIRED IN THE 4D-TO-1D CONSTELLATION MAPPING CONVERTERS OF FIGS. 4 AND 12 | |
|---|---|---|---|---|
| 2-VSB | 3 | 7 | SET $Z1_m, Z2_m,$ AND $Z3_m$ TO ZERO | — |
| 4-VSB | 7 | 15 | SET $Z2_m$ AND $Z3_m$ TO ZERO | — |
| 6-VSB | 9 | 19 | SET $Z3_m$ TO ZERO | APPLY THE FRACTIONAL BIT ENCODER OF FIG. 8 |
| 8-VSB | 11 | 23 | SET $Z3_m$ TO ZERO | — |
| 12-VSB | 13 | 27 | — | APPLY THE FRACTIONAL BIT ENCODER OF FIG. 9 |
| 16-VSB | 15 | 31 | — | — |

FIG. 8
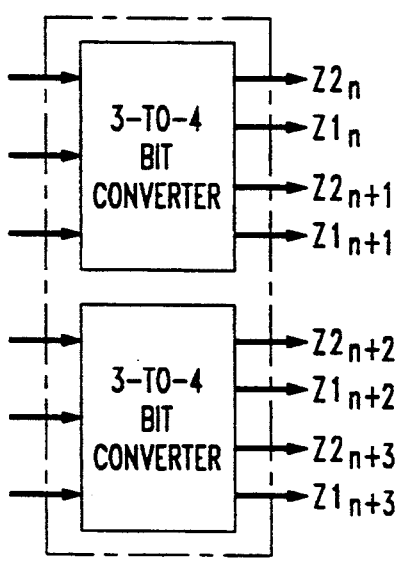
FIG. 9
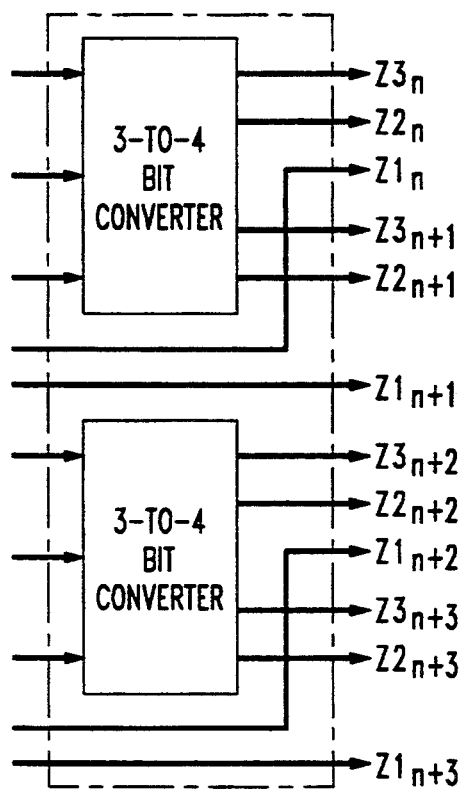
FIG. 10
| 3-TO-4 BIT CONVERTER | | | | | | |
|---|---|---|---|---|---|---|
| INPUT BIT PATTERN* | | | OUTPUT BIT PATTERN* | | | |
| 0 | 0 | 0 | 0 | 0 | 0 | 0 |
| 0 | 0 | 1 | 0 | 0 | 0 | 1 |
| 0 | 1 | 0 | 0 | 1 | 0 | 0 |
| 0 | 1 | 1 | 0 | 1 | 0 | 1 |
| 1 | 0 | 0 | 1 | 0 | 0 | 0 |
| 1 | 0 | 1 | 1 | 0 | 0 | 1 |
| 1 | 1 | 0 | 0 | 0 | 1 | 0 |
| 1 | 1 | 1 | 0 | 1 | 1 | 0 |
*READING FROM TOP TO BOTTOM IN FIGS 8 AND 9

FIG. 13

| 8D SUBSET $V3_n\ V2_n\ V1_n\ V0_n$ | 4D-SUBSET PAIRS $(Y2_n\ Y1_n\ Y0_n,\ Y2_{n+4}\ Y1_{n+4}\ Y0_{n+4})$ |
|---|---|
| 0 | (0,0),(2,2),(4,4),(6,6) |
| 1 | (0,1),(2,3),(4,5),(6,7) |
| 2 | (0,2),(2,0),(4,6),(6,4) |
| 3 | (0,3),(2,1),(4,7),(6,5) |
| 4 | (0,4),(2,6),(4,0),(6,2) |
| 5 | (0,5),(2,7),(4,1),(6,3) |
| 6 | (0,6),(2,4),(4,2),(6,0) |
| 7 | (0,7),(2,5),(4,3),(6,1) |
| 8 | (1,1),(3,3),(5,5),(7,7) |
| 9 | (1,0),(3,2),(5,4),(7,6) |
| 10 | (1,3),(3,1),(5,7),(7,5) |
| 11 | (1,2),(3,0),(5,6),(7,4) |
| 12 | (1,5),(3,7),(5,1),(7,3) |
| 13 | (1,4),(3,6),(5,0),(7,2) |
| 14 | (1,7),(3,5),(5,3),(7,1) |
| 15 | (1,6),(3,4),(5,2),(7,0) |

CONCATENATED CODED VESTIGIAL SIDEBAND MODULATION FOR HIGH DEFINITION TELEVISION

BACKGROUND OF THE INVENTION

The present invention relates to high definition television.

The competition among various industrial and academic institutions within the United States to win the approval of the Federal Communications Commission (FCC) for standardization of their respective versions of high definition television, or HDTV, has come to an end. In place of that competition and rivalry, a so-called Grand Alliance has come into being in which the former contestants are pooling their resources and expertise to arrive at a single standard that will be recommended to the FCC.

Most recently, the Grand Alliance has recommended that the FCC adopt as the modulation scheme for HDTV an approach that had been proposed by Zenith Corporation. The basic components of that modulation scheme are a concatenated coder driving a vestigial sideband (VSB) modulator. The concatenated coder, in particular, implements a particular Reed-Solomon code as the so-called "outer" code followed by a particular one-dimensional, four-state trellis coder as to so-called "inner" code. The Reed-Solomon code is the so-called (208,188) code. The one-dimensional trellis code is the code described, for example, in G. Ungerboeck, "Channel coding with multilevel/phase signals," *IEEE Transactions on Information Theory*, vol. IT-28, pp. 55-67, January 1982. The VSB modulator uses an eight-symbol, one-dimensional constellation, so that for each successive transmission symbol period, the concatenated coder, responsive to the source-coded HDTV signal bit stream, identifies to the modulator a particular one of the eight one-dimensional VSB symbols to be transmitted.

SUMMARY OF THE INVENTION

The Grand Alliance's proposed approach of using a concatenated code comprising an outer Reed-Solomon code and an inner trellis code provides significantly improved performance over modulation schemes previously proposed for HDTV. However, I have recognized that a particular trellis coded modulation technique known and used heretofore in the voiceband modem arena—where most of my own efforts have been concentrated for many years—can be advantageously brought to bear in the television arena—and, more particularly, the HDTV arena to provide even greater levels of performance than that achievable by the most recent Grand Alliance proposal.

As in the current Grand Alliance proposal, my modulation scheme uses a concatenated code comprised of a Reed-Solomon coder followed by a trellis coder. However, my scheme uses an N-dimensional trellis code, where N>1, rather than the one-dimensional trellis code as proposed by the Grand Alliance. The output of the concatenated code thus identifies a sequence of N-dimensional symbols. Significantly, and in a departure from any prior art of which I am aware—either in the voiceband modem or television arenas—each N-dimensional symbol is transmitted as a sequence of one-dimensional signal points—specifically signal points of a one-dimensional VSB constellation. Advantageously, then, my modulation scheme thus preserves the well-understood, and much-to-be-desired, advantages of using VSB for HDTV, on the one hand, while providing improved performance over the best modulation scheme that the Grand Alliance has yet offered to date. The improved performance, in particular, is manifested in the form of various levels of increased robustness against noise and other impairments for various levels of transmission bit rates.

Greater-than-one-dimensional trellis codes are not new. Moreover, it is known as a general matter that an N-dimensional symbol, such as an eight-dimensional symbol, can be communicated by transmitting a sequence of signal points of lower dimensionality, e.g., four two-dimensional signal points, such as so-called QAM signal points. However, the level of skill of the ordinary worker in the television field, and the focus of those who have worked on the HDTV standard, are such as to make the present invention highly inventive for at least those applications.

As detailed hereinbelow, I have devised a number of specific modulation schemes embodying the above-described principles of the invention which offer various tradeoffs between noise performance and bit rate, for both over-the-air and cable applications.

BRIEF DESCRIPTION OF THE DRAWING

FIGS. 4–10 provide implementational details for a four-dimensional, eight-state trellis code that can be used in implementing the invention; and FIGS. 11–13 provide implementational details for a eight-dimensional, 16-state trellis code that can be used in implementing the invention.

DETAILED DESCRIPTION

Figure 1:
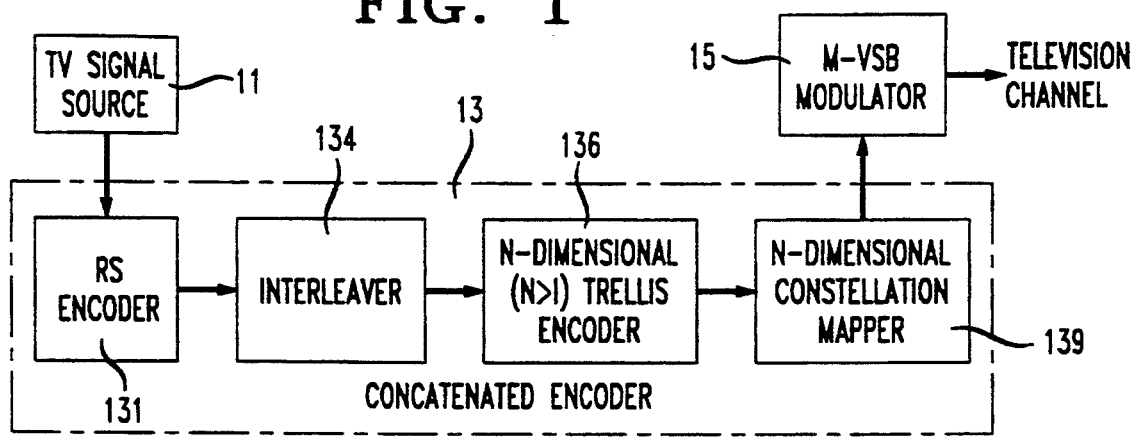
FIG. 1 is a block diagram of a television transmitter embodying the principles of the invention.

FIG. 1 shows a television transmitter embodying the principles of the invention. A television signal—illustratively an HDTV signal—is provided by TV signal source 11. TV signal source 11 includes circuitry for compressing the TV signal and putting it into an HDTV format, as well as certain standard modem-type circuitry such as a circuitry which randomizes the bit stream—the so-called "scrambler."

The HDTV signal thus generated is applied to concatenated encoder 13, which includes the serial combination of Reed-Solomon "outer" encoder 131, interleaver 134, which, in conventional fashion reorders the sequence of Reed-Solomon symbols generated by encoder 131 in order to provide protection against so-called "bursty" errors introduced either in the television channel or the receiver, and N-dimensional trellis encoder 136. The output of encoder 136 is a sequence of data words identifying a sequence of N-dimensional symbols. Each of the N-dimensional symbols is to be transmitted in the form of a sequence of N one-dimensional signal points. To this end, the data words identifying the N-dimensional symbols are applied within concatenated encoder 13 to N-dimensional constellation mapper 139, whose output for each identified symbol is a sequence of N one-dimensional signal points. Since the signal points are one-dimensional, each signal point is simply represented as a signed number. There are M possible signal point values.

The signal point values thus generated are applied to an M-ary modulator—specifically, an M-VSB modulator 15. The "M" signifies that the amplitude of the VSB signal can take on one of the aforementioned M signal point values. M is thus the "size" of the one-dimensional signal "constellation" implemented by the modulator. M-VSB modulator 15 includes, of course, modulation circuitry. It also includes a second interleaver which rearranges the sequence of signal points in such a way that successive signal points generated by concatenated encoder 13 do not appear in succession in the modulated signal. This is desirable in order to ensure optimal performance of Viterbi decoder 236 described below. M-VSB modulator 15 also includes a one-dimensional precoder of the type described in my U.S. patent application Ser. No. 829,820 filed Feb. 3, 1992, allowed on Dec. 7, 1993 entitled "Partial-Response-Channel Precoding," and now U.S. Pat. No. 5,311,547 issued May 10, 1994, hereby incorporated by reference.

In accordance with the present invention, $N>1$. That is, although the signal points to be communicated by M-VSB modulator are only one-dimensional, concatenations of those signal points are used to represent greater-than-one-dimensional symbols. Advantageously, this approach preserves the well-understood, and much-to-be-desired, advantages of using VSB for HDTV and other television applications, on the one hand, while providing improved performance over the prior art, which uses one-dimensional trellis encoding.

Figure 2:
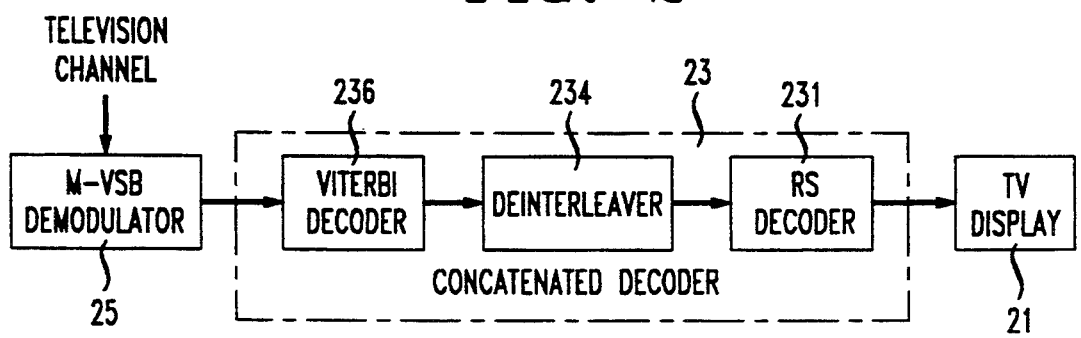
FIG. 2 is a block diagram of a television receiver adapted to receive and process the signals transmitted by the transmitter of FIG. 1.

The VSB signal generated by modulator 15 are applied to a television channel, such as an over-the-air channel or a cable, and are received by the receiver of FIG. 2.

More particularly, the VSB signal is applied to M-VSB demodulator 25, which includes a VSB demodulator; various filters—including a comb filter as described in my above-cited patent—an equalizer; and a deinterleaver, which performs the inverse operation of the above-mentioned "second" interleaver in modulator 15, thereby restoring the signal points to their original order.

The sequence of one-dimensional signal points appearing at the output of demodulator 25 are applied to concatenated decoder 23 and, more particularly, Viterbi decoder 236 thereof. The output of Viterbi decoder 236 is the sequence of interleaved Reed-Solomon symbols that was provided at the output of interleaver 134 in the transmitter. Those symbols are returned to their original order by deinterleaver 234, which performs the inverse operation of interleaver 134 and are decoded by Reed-Solomon decoder 231. The output of Reed-Solomon decoder 231 is applied to TV display 21 which decompresses and deformats the television signal and presents it on a CRT or other viewing screen.

(Although not explicitly shown or described herein, it should be mentioned, as is well known by those skilled in the art, that so-called synchronization signal points are periodically inserted by modulator 15 into the signal point stream that it receives from constellation mapper 139. Demodulator 25 recognizes these synchronization signal points and, in response, generates a synchronization control signal which is used, in conventional fashion, by various of the components of the receiver (e.g., deinterleaver 234) in order to synchronize their operations with those of corresponding components in the transmitter (e.g, interleaver 134).

The internal structures of the various components of the transmitter and receiver of FIGS. 1 and 2 hereof generally similar to those known to persons skilled in the television and/or voiceband telephone communications (modem) arts. They thus need not be described in further detail herein. It thus remains only to describe some preferred embodiments for Reed-Solomon encoder 131 and trellis encoder 139.

In various illustrative embodiments, the Reed-Solomon code is a so-called RS(198,188) code over a GF(256), which means that each RS codeword has 188 data symbols and ten redundant symbols, each symbol consisting of eight bits. The trellis code is illustratively a four-dimensional, eight-state trellis code as described below. Choosing the aforementioned VSB constellation size M to be equal to 4, for example, and using the signaling rate currently included in the aforementioned one-dimensional coding scheme proposed for HDTV, a television signal bit rate (including the bits representing the aforementioned synchronization signal points) of 17.9 Mbps can be supported at a signaling rate of $10.76 \times 10^6$ signal points per second. (In all the other examples given below, the same signaling rate is used, although, of course, the invention can be used with any desired signaling rate.) With $M=6$ and $M=16$, bit rates of 23.0 and 38.3 Mbps, respectively, can be supported.

Other embodiments may use an eight-dimensional 16-state trellis code, also described below, using the same Reed-Solomon code as before. For $M=4$ and $M=16$, bit rates of 19.2 and 39.6 Mbps, respectively, can be supported.

Depending on the noisiness of transmission environment, more or less powerful Reed-Solomon codes can be used in order to trade off error-correcting power against the bit rate. For example, an RS(208,188) code with the four-dimensional, eight-state trellis code and $M=6$ will provide enhanced noise immunity at a bit rate of 21.9 Mbps as contrasted with the higher bit rate of 23.0 Mbps provided by RS(198,188). Conversely, an RS(194,188)code with the four-dimensional, eight-state trellis code and $M=16$ will provide reduced noise immunity at a bit rate of 39.1 Mbps as contrasted with the lower bit rate of 38.3 Mbps provided by RS(198,188).

The transmission environment will also be a major factor in the choice of the value of M. The larger the value of M, the closer the signal points of the constellation for a given transmitted signal power. Thus, for a given level of noise, larger values of M translate into worse noise performance. The cable transmission environment, however, is typically less noisy than the over-the-air environment and, therefore, can support larger values of M while still achieving an adequate level of noise performance. In particular, it is anticipated that the above-described embodiments using $M=16$ would be fine candidates for cable transmission, but would not provide adequate noise performance in the over-the-air environment.

Figure 3:
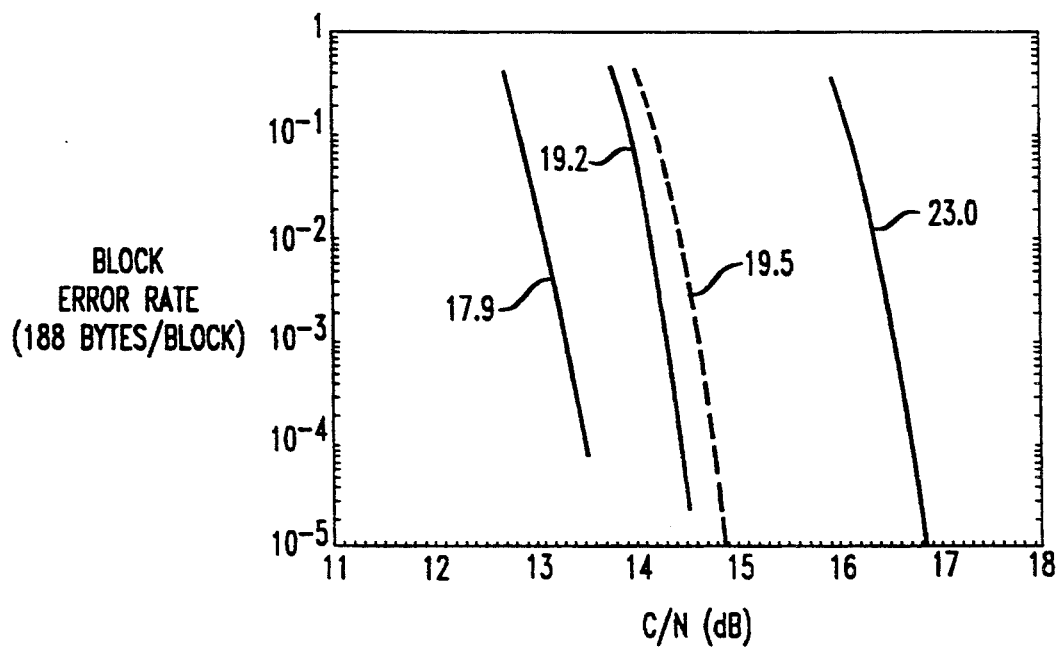
FIG. 3 is a graph comparing the Gaussian noise performance of various embodiments of the invention with each other and with the prior art.

FIG. 3 illustrates the performance of various ones of the above-mentioned embodiments in which $M=4$ and $M=6$. The X axis is the carrier-to-noise (C/N) ratio, where the noise is assumed to be Gaussian noise and the Y axis is the block error rate achieved for a given (C/N) level. The three curves shown in solid line respectively represent the three examples given above which achieve the bit rates of 17.9, 19.2 and 23.0 Mbps, and are labeled with those bit rates for purposes of identification. The curve shown in dashed line and labeled as 19.5 represents the one-dimensional coding scheme currently being proposed for HDTV, which employs RS(208,198), a one-dimensional, four-state trellis code and 8-VSB modulation to support a bit rate of 19.5 Mbps. What is significant to observe from FIG. 3 is that the 19.2 Mbps scheme of the present invention achieves approximately the same Gaussian noise performance as the 19.5 Mbps scheme at approximately the same bit rate. However, my scheme achieves this result with M=4, rather than M=8. This is highly significant because the smaller constellation size (i.e., smaller value of M) provides greater immunity to channel impairments other than Gaussian noise, such as various linear and non-linear distortions. (These impairments are more severe in the over-the-air environment than in the cable environment.) A smaller constellation also provides greater robustness against rounding errors and other similar effects that manifest themselves in any real-world implementation. Additionally, various factors relating, for example, to equalizer performance come into play as the constellation is made larger and larger. This puts an upper limit on the constellation size, as a practical matter. By providing (at least) comparable levels of noise performance and bit rates with a smaller constellation, the present invention permits higher bit rates to be achieved than with the prior an one-dimensional trellis encoding approach before that upper limit is reached.

FIG. 3 also shows that by accepting the lower bit rate of 17.9 Mbps, one can achieve a better level of noise performance than the 19.5 Mbps scheme, and that, conversely, a high bit rate of 23.0 Mbps can be achieved at a sacrifice of noise performance.

The M=16 embodiments exhibit similar characteristics.

Figure 4:
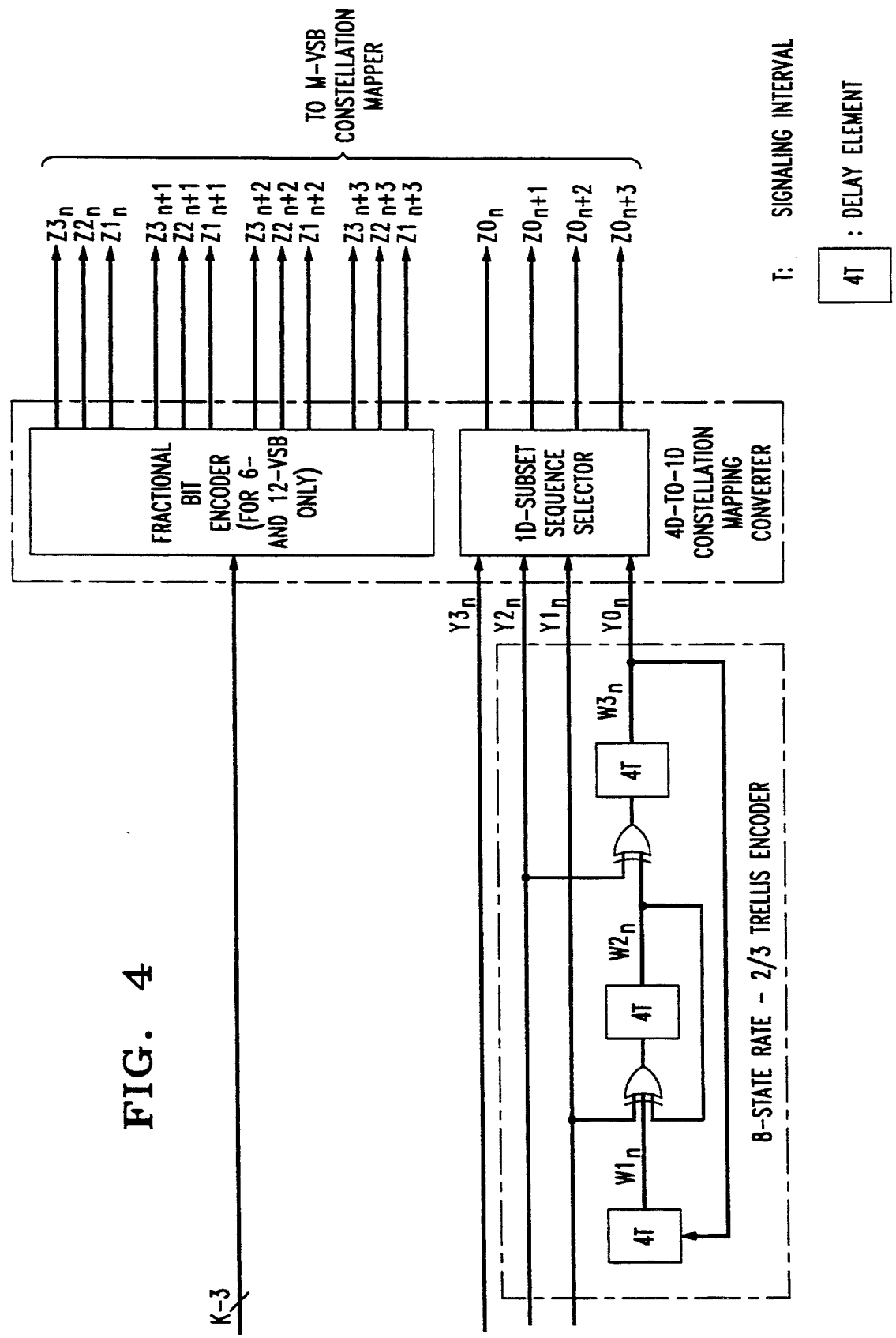
Figures 5, 6:
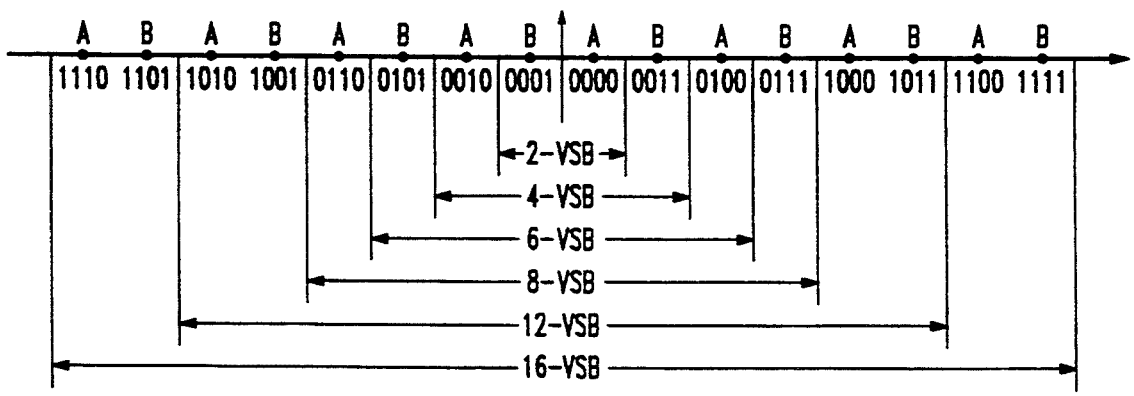

FIGS. 4-6 show details for implementing the four-dimensional, eight state trellis code. These FIGS. will be first described assuming that M=16. Implementations with smaller values of M will be described thereafter.

The parameter K is the number of bits collected by trellis encoder 136 from the output of interleaver 134 over a succession of four signaling intervals (corresponding, in total, to one symbol period). Illustratively, K=15. The four signaling intervals are n, n+1, n+2, and n+3.

The first step in designing any trellis coded modulation scheme is to select and partition its constellation. As described above, the trellis coded modulation scheme here is constructed using a four-dimensional 16-VSB constellation that is formed with four one-dimensional 16-VSB constellations in the time domain. The four-dimensional constellation has $2^{16}$ four-dimensional symbols, each four-dimensional symbol being a sequence of four one-dimensional signal points from the one-dimensional 16-VSB constellation. The partition of the four-dimensional constellation is based on that of its constituent one-dimensional constellations. FIG. 6 shows how the one-dimensional 16-VSB constellation is partitioned into two subsets, A and B, each subset having eight one-dimensional signal points. The four-dimensional constellation is then partitioned into eight four-dimensional subsets, 0, 1, ..., and 7. Each four-dimensional subset consists of two sequences of four one-dimensional subsets, as shown in FIG. 5. For example, four-dimensional subset 0 consists of one-dimensional-subset sequences (A,A,A,A) and (B,B,B,B). Clearly, each one-dimensional-subset sequence has $2^{12}$ four-dimensional symbols, for a total of $2^{13}$ four-dimensional symbols in each four-dimensional subset.

Once the four-dimensional constellation is selected and partitioned, the encoding operations of the trellis coded modulation scheme here proceed as follows. Referring to FIG. 4, two out of the K (=15) input bits enter an 8-state rate-$\frac{2}{3}$ trellis encoder to generate three output bits, $Y2_n$, $Y1_n$, and $Y0_n$. Conceptually, these three bits are used to identify first a four-dimensional subset $Y2_n Y1_n Y0_n$ from the four-dimensional constellation. The remaining K-2 (=13) uncoded input bits are then used to select a four-dimensional symbol ($P_n$, $P_{n+1}$, $P_{n+2}$, $P_{n+3}$) from the identified four-dimensional subset, each $P_m$ being a one-dimensional signal point.

In implementation, the above two-step process for selecting a four-dimensional symbol from the four-dimensional constellation is done through a four-dimensional-to-one-dimensional constellation mapping converter of FIG. 4, as explained below. The three bits, $Y2_n$, $Y1_n$, and $Y0_n$, from the trellis encoder, along with an uncoded input bit $Y3_n$, are first converted by a one-dimensional-subset-sequence selector into another four bits, $Z0_n$, $Z0_{n+1}$, $Z0_{n+2}$, and $Z0_{n+3}$. FIG. 5 shows the detail of this conversion. The four converted bits and the remaining K-3 (=12) uncoded input bits are then divided into four groups $\{Z3_m, Z2_m, Z1_m, Z0_m\}$ for m=n, n+1, n+2, and n+3. Each group is used to select a one-dimensional signal point $P_m$ from the one-dimensional 16-VSB as shown in FIG. 6.

The four-dimensional 8-state trellis-coded 16-VSB scheme described above can be easily scaled to smaller M-VSB with M=2, 4, 6, 8, and 12. The scaling involves only two minor changes: One is the number K of input bits collected by the trellis coded modulation scheme over a sequence of four signaling intervals, and the other is a change to the upper part of the four-dimensional-to-one-dimensional constellation mapping converter of FIG. 4, where the K-3 uncoded input bits are converted. Both changes are detailed in FIG. 7. Note that for M=2, 4, 8, and 16, the K-3 uncoded input bits simply pass through the converter. And for M=6 and 12, simple fractional bit encoders as shown in FIGS. 8 and 9, respectively, are used, where the 3-to-4 bit converter shown in those FIGS. implements the table shown in FIG. 10. This encoder is referred to as fractional because, conceptually, it divides its K-3 (=6 or 10) input bits evenly among the four signaling intervals, which results in a fractional number of bits per interval.

The scaling just mentioned could be used not only to arrive at an initial "default" design for a television transmission system but, in addition, as a way of implementing various "fallback" transmission modes which would be invoked under circumstances of severe channel conditions.

Figure 11:
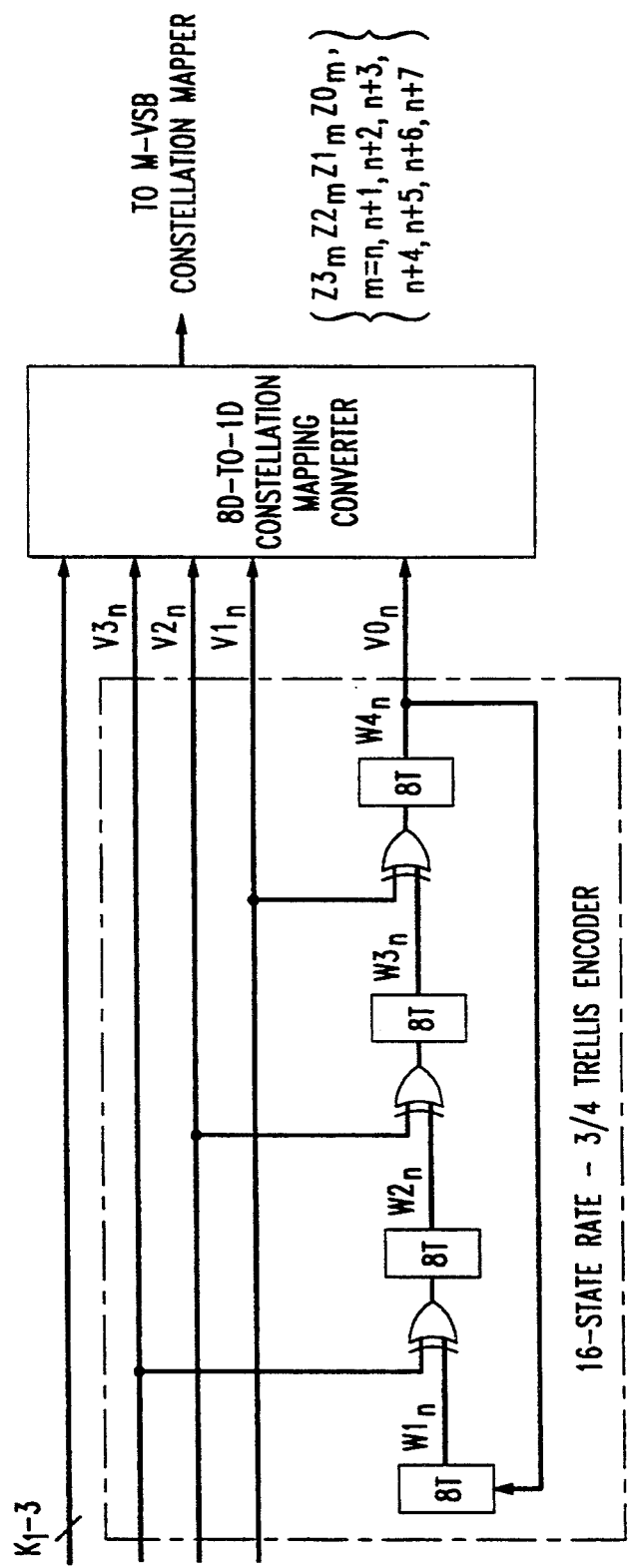
Figure 12:
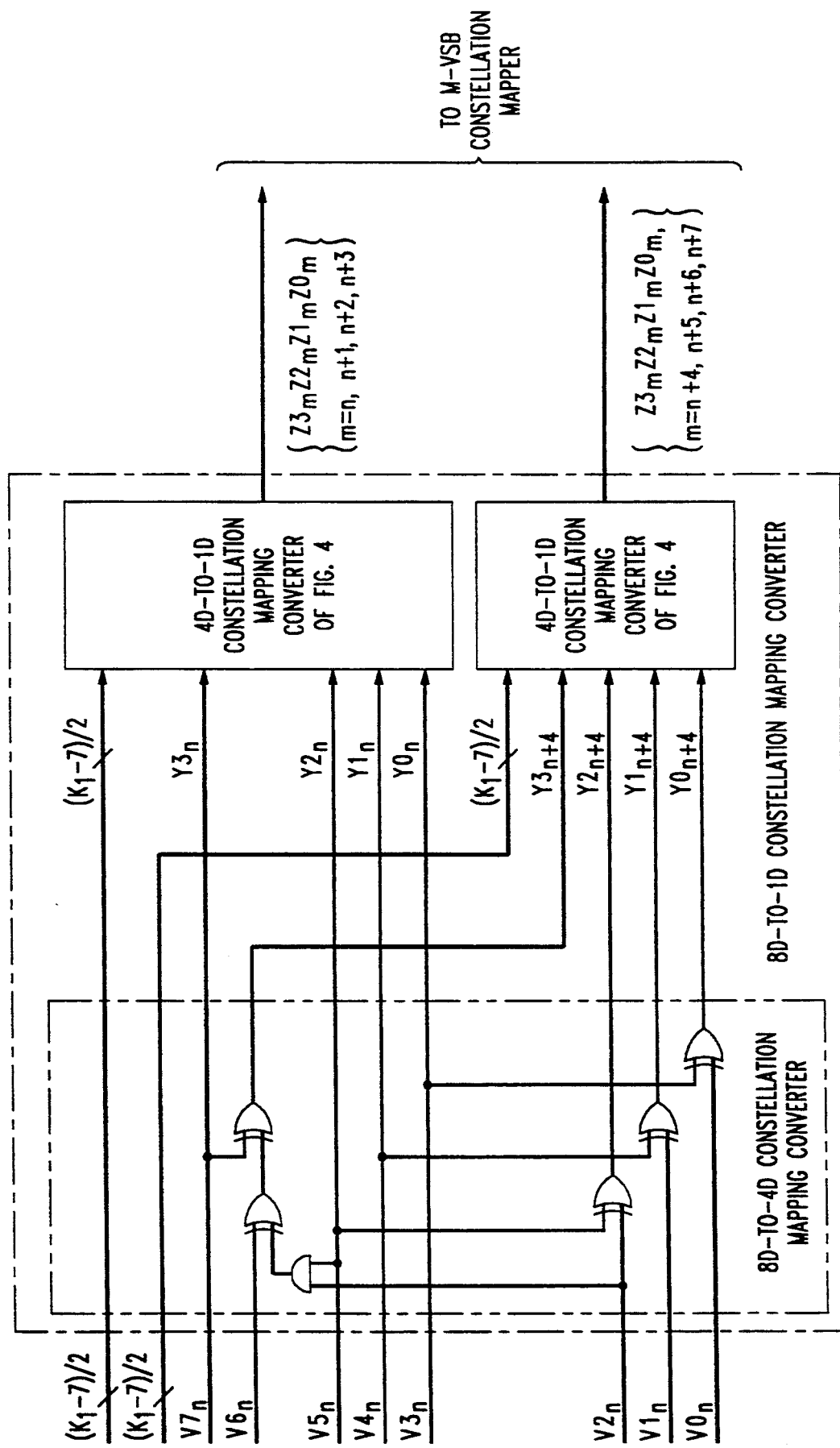

FIGS. 11-13 describe the eight-dimensional 16-state trellis-coded M-VSB scheme for M=2, 4, 6, 8, 12, and 16, where $K_1$ in the FIGS. denotes the number of input bits collected by the trellis coded modulation scheme over a sequence of eight signaling intervals n, n+1, ..., and n+7.

The trellis coded modulation scheme here is constructed using an eight-dimensional M-VSB constellation that is formed with eight one-dimensional M-VSB, or equivalently, two four-dimensional M-VSB constellations in the time domain. The partition of the eight-dimensional constellation is based on that of its constituent four-dimensional constellations. Each constituent four-dimensional constellation is partitioned into eight four-dimensional subsets as above. The eight-dimensional constellation is then partitioned into sixteen eight-dimensional subsets, 0, 1, . . ., and 15. Each eight-dimensional subset consists of four pairs of four-dimensional subsets, as shown in FIG. 13. For example, eight-dimensional subset 0 consists of four-dimensional-subset pairs (0,0), (2,2), (4,4), and (6,6).

The encoding operations of the trellis coded modulation scheme here proceed as follows. Referring to FIG. 11, three out of the $K_1$ input bits enter a 16-state rate-$\frac{3}{4}$ trellis encoder to generate four output bits, $V3_n$, $V2_n$, $V1_n$, and $V0_n$. Conceptually, these four bits are used to identify first an eight-dimensional subset $V3_n\ V2_n\ V1_n\ V0_n$ from the eight-dimensional constellation. The remaining $K_1-3$ uncoded input bits are then used to select an eight-dimensional symbol $(P_n, P_{n+1}, \ldots P_{n+7})$ from the identified eight-dimensional subset, each $P_m$ being a one-dimensional signal point.

In implementation, the above two-step process for selecting an eight-dimensional symbol from the eight-dimensional constellation is done through an eight-dimensional-to-one-dimensional constellation mapping converter of FIGS. 11 and 12, as explained below. The four bits, $V3_n$, $V2_n$, $V1_n$, and $V0_n$, from the trellis encoder, along with four uncoded input bits, $V7_n$, $V6_n$, $V5_n$, and $V4_n$, are first converted by an eight-dimensional-to-four-dimensional constellation mapping converter into another eight bits $\{Y3_m, Y2_m, Y1_m, Y0_m\}$ for $m=n$ and $n+4$. The eight converted bits and the remaining $K_1-7$ uncoded input bits are then evenly divided into two groups. Each group is used to select a four-dimensional symbol $(P_n, P_{n+1}, P_{n+2}, P_{n+3})$ or $(P_{n+4}, P_{n+5}, P_{n+6}, P_{n+7})$ from the four-dimensional M-VSB constellation as above.

The scaling of the eight-dimensional 16-state trellis coded modulation scheme to different values of M involves again only two minor changes: One is the number $K_1$ of input bits collected by the trellis coded modulation scheme over a sequence of eight signaling intervals, and the other is a change in the four-dimensional-to-one-dimensional constellation mapping converters of FIG. 12 (which are identical to that of FIG. 4). Both changes are also detailed in FIG. 7.

The foregoing merely illustrates the principles of the invention. For example, all of the parameter values herein, such as M, the number of states and the number of dimensions in the trellis codes, the partition of the N-dimensional M-VSB constellation, the Reed-Solomon code parameters, the bit rates, the signaling rates etc. are all illustrative. Moreover, although the signals communicated are illustratively television signals, they are, of course, simply streams of bits and, as such, could be derived from any source and could be, for example, derived from text or any other source.

Although the VSB constellation shown in FIG. 6 has its signal points centered about the origin, they need not be. For example, a non-centered constellation will give rise to a pilot tone in the VSB signal (corresponding to a dc component in the baseband) which can be used, for example, for carrier recovery.

Moreover, although the various components of the transmitter and receiver are shown as individual functional blocks, the functions of any one or more of them could be provided by, for example, a single processor operating until software control; by one or more digital signal processing (DSP) chips; or by special-purpose integrated circuitry.

Other implementational variations are possible. For example, trellis encoder 136 and constellation mapper 139 could be replaced by a bank of trellis encoders and associated constellation mappers. Each of the trellis encoders would receive a successive output of the interleaver in a round-robin fashion and each of the constellation mappers would provide a one-dimensional signal point in a round-robin fashion to M-VSB modulator 15. This approach, when used, provides the functionality of, and can substitute for, the above-mentioned second interleaver within the modulator. The aforementioned bands of trellis encoders and associated constellation mappers need not be physically separate elements. Rather, the effect of such a bank could be achieved by time-sharing a single trellis encoder and constellation mapper in a manner that will be apparent to those skilled in the art.

It will thus be appreciated that those skilled in the an will be able to devise numerous arrangements which, although not explicitly shown or described herein, embody the principles of the invention and are within its spirit and scope.

I claim:

1. A method of transmitting a digital signal over a television channel, the method comprising the steps of
Reed-Solomon encoding the digital signal,
generating a sequence of N-dimensional symbols as a function of the Reed-Solomon-encoded signal using an N-dimensional trellis code, $N>1$,
representing each of said symbols as a sequence of N one-dimensional signal points of a one-dimensional M-ary transmitter constellation,
generating a vestigial sideband modulation signal which represents the resulting sequence of signal point representations, and
applying said vestigial sideband modulation signal to said television channel.

2. The invention of claim 1 wherein said television channel is a cable channel and wherein M=16.

3. The invention of claim 1 wherein the symbol-generating step includes the steps of interleaving the Reed-Solomon-encoded signal and trellis-encoding the resulting interleaved signal.

4. The invention of claim 1 wherein said trellis code is a four-dimensional trellis code.

5. The invention of claim 4 wherein said trellis code is an eight-state trellis code.

6. The invention of claim 4 wherein said television channel is an over-the-air channel and wherein M is selected from the group consisting of 4 and 6.

7. The invention of claim 1 wherein said trellis code is an eight-dimensional trellis code.

8. The invention of claim 7 wherein said television channel is an over-the-air channel and wherein M=4.

9. The invention of claim 7 wherein said trellis code is a 16-state trellis code.

10. Apparatus for transmitting a digital signal over a television channel, the apparatus comprising
means for Reed-Solomon encoding the digital signal,
means for generating a sequence of N-dimensional symbols as a function of the Reed-Solomon-encoded signal using an N-dimensional trellis code, $N>1$,
means for representing each of said symbols as a sequence of N one-dimensional signal points of a one-dimensional M-ary transmitter constellation, and means for generating a vestigial sideband modulation signal which represents the resulting sequence of signal point representations and for applying said vestigial sideband modulation signal to said television channel.

11. The invention of claim 10 wherein said television channel is a cable channel and wherein M=16.

12. The invention of claim 10 wherein the symbol-generating means includes means for interleaving the Reed-Solomon-encoded signal and means for trellis-encoding the resulting interleaved signal.

13. The invention of claim 10 wherein said trellis code is a four-dimensional trellis code.

14. The invention of claim 13 wherein said trellis code is an eight-state trellis code.

15. The invention of claim 13 wherein said television channel is an over-the-air channel and wherein M is selected from the group consisting of 4 and 6.

16. The invention of claim 10 wherein said trellis code is an eight-dimensional trellis code.

17. The invention of claim 16 wherein said television channel is an over-the-air channel and wherein M=4.

18. The invention of claim 16 wherein said trellis code is a 16-state trellis code.

19. A method of processing a television channel signal, said television channel signal having been generated by Reed-Solomon encoding a digital signal; generating a sequence of N-dimensional symbols as a function of the Reed-Solomon-encoded signal using an N-dimensional trellis code, N>1; representing each of said symbols as a sequence of N one-dimensional signal points of a one-dimensional M-ary transmitter constellation; generating a vestigial sideband modulation signal which represents the resulting sequence of signal point representations; and applying said vestigial sideband modulation signal to a television channel to produce said television channel signal; said method comprising the step of receiving said television channel signal from said television channel, and recovering said digital signal from said received television channel signal.

20. The invention of claim 19 wherein said recovering step comprises the steps of demodulating said received television channel signal to generate a demodulated signal;

processing the demodulated signal to recover said sequence of N-dimensional symbols, and processing the recovered sequence of N-dimensional symbols to recover said digital signal.

21. The invention of claim 20 wherein said step of processing the demodulated signal includes the step of Viterbi decoding said demodulated signal.

22. The invention of claim 20 wherein said step of processing the recovered sequence of N-dimensional symbols includes Reed-Solomon decoding.

23. The invention of claim 20 wherein said television channel is a cable channel and wherein M=16.

24. The invention of claim 20 wherein said trellis code is a four-dimensional trellis code.

25. The invention of claim 24 wherein said trellis code is an eight-state trellis code.

26. The invention of claim 24 wherein said television channel is an over-the-air channel and wherein M is selected from the group consisting of 4 and 6.

27. The invention of claim 20 wherein said trellis code is an eight-dimensional trellis code.

28. The invention of claim 27 wherein said television channel is an over-the-air channel and wherein M=4.

29. The invention of claim 27 wherein said trellis code is a 16-state trellis code.

30. A method for processing a television channel signal, said television channel signal having been generated by Reed-Solomon encoding a digital signal; interleaving the Reed-Solomon-encoded signal; generating a sequence of N-dimensional symbols in response to the Reed-Solomon-encoded signal using an N-dimensional trellis code, N>1; representing each of said symbols as a sequence of N one-dimensional signal points of a one-dimensional M-ary transmitter constellation; generating a vestigial sideband modulation signal which represents the resulting sequence of signal point representations; and applying said vestigial sideband modulation signal to a television channel to produce said television channel signal; said method comprising the steps of receiving said television channel signal from said television channel, demodulating said television channel signal to generate a demodulated signal;

Viterbi decoding said demodulated signal to recover said sequence of N-dimensional symbols, deinterleaving the recovered sequence of N-dimensional symbols, and Reed-Solomon decoding the deinterleaved symbols to recover said digital signal.

31. Apparatus for processing a television channel signal, said television channel signal having been generated by Reed-Solomon encoding a digital signal; generating a sequence of N-dimensional symbols as a function of the Reed-Solomon-encoded signal using an N-dimensional trellis code, N>1; representing each of said symbols as a sequence of N one-dimensional signal points of a one-dimensional M-ary transmitter constellation; generating a vestigial sideband modulation signal which represents the resulting sequence of signal point representations; and applying said vestigial sideband modulation signal to a television channel to produce said television channel signal; said apparatus comprising means for receiving said television channel signal from said television channel, and means for recovering said digital signal from said received television channel signal.

32. The invention of claim 31 wherein said recovering means includes means for demodulating said television channel signal to generate a demodulated signal;

means for processing the demodulated signal to recover said sequence of N-dimensional symbols, and means for processing the recovered sequence of N-dimensional symbols to recover said digital signal.

33. The invention of claim 32 wherein said means for processing the demodulated signal includes means for Viterbi decoding said demodulated signal.

34. The invention of claim 33 wherein said means for processing the recovered sequence of N-dimensional symbols includes a Reed-Solomon decoder.

35. The invention of claim 32 wherein said television channel is a cable channel and wherein M=16.

36. The invention of claim 32 wherein said trellis code is a four-dimensional trellis code.

37. The invention of claim 36 wherein said trellis code is an eight-state trellis code.

38. The invention of claim 36 wherein said television channel is an over-the-air channel and wherein M is selected from the group consisting of 4 and 6.

39. The invention of claim 32 wherein said trellis code is an eight-dimensional trellis code.

40. The invention of claim 39 wherein said television channel is an over-the-air channel and wherein M=4.

41. The invention of claim 39 wherein said trellis code is a 16-state trellis code.

42. Apparatus for processing a television channel signal, said television channel signal having been generated by Reed-Solomon encoding a digital signal; interleaving the Reed-Solomon-encoded signal; generating a sequence of N-dimensional symbols in response to the Reed-Solomon-encoded signal using an N-dimensional trellis code, N>1; representing each of said symbols as a sequence of N one-dimensional signal points of a one-dimensional M-ary transmitter constellation; generating a vestigial sideband modulation signal which represents the resulting sequence of signal point representations; and applying said vestigial sideband modulation signal to a television channel to produce said television channel signal; said apparatus comprising means for receiving said television channel signal from said television channel, means for demodulating said television channel signal to generate a demodulated signal;

means for Viterbi decoding said demodulated signal to recover said sequence of N-dimensional symbols, means for deinterleaving the recovered sequence of N-dimensional symbols, and means for Reed-Solomon decoding the deinterleaved symbols to recover said digital signal.

* * * * *